United States Patent
Yim et al.

(10) Patent No.: US 8,428,165 B2
(45) Date of Patent: Apr. 23, 2013

(54) METHOD AND SYSTEM FOR DECODING OFDM SIGNALS SUBJECT TO NARROWBAND INTERFERENCE

(75) Inventors: Raymond Yim, Cambridge, MA (US); Amitav Mukherjee, Irvine, CA (US); Philip V. Orlik, Cambridge, MA (US); Chunjie Duan, Brookline, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 301 days.

(21) Appl. No.: 12/982,636

(22) Filed: Dec. 30, 2010

(65) Prior Publication Data
US 2012/0170684 A1    Jul. 5, 2012

(51) Int. Cl.
*H04B 1/10* (2006.01)
*H04L 27/28* (2006.01)

(52) U.S. Cl.
USPC ............ 375/260; 375/346; 375/349; 375/350

(58) Field of Classification Search ............ 375/260, 375/267, 322, 324, 329, 340, 346–350
See application file for complete search history.

(56) References Cited

U.S. PATENT DOCUMENTS

| | | | |
|---|---|---|---|
| 2005/0190868 A1* | 9/2005 | Khandekar et al. ........... | 375/346 |
| 2007/0127588 A1* | 6/2007 | Kim .............................. | 375/267 |
| 2009/0238123 A1* | 9/2009 | Kuri et al. ..................... | 370/329 |
| 2012/0033721 A1* | 2/2012 | Isson et al. .................... | 375/227 |

* cited by examiner

*Primary Examiner* — David B. Lugo
(74) *Attorney, Agent, or Firm* — Gene Vinokur; Dirk Brinkman (57) ABSTRACT

A method estimates a wireless channel at a receiver. The signal is transmitted using narrowband orthogonal frequency division demultiplexing (OFDM) and frequency subcarriers, and the signal includes a set of data tones and a set of pilot tones. The channel and pilot tone interference are estimated based on all the pilot tones extracted from the signal and a channel model. The set of data are equalized based on the channel estimate. Data interference is detected according to the pilot interference and the equalized data tones. Subcarrier interference-to-noise ratios are determined based on the data interference. Signal strengths of the data tones are determined based on the equalized data tones, log-likelihood ratios of bits represented by the data tones are determined based on the subcarrier interference-to-noise ratios and the signal strength of the data tones.

11 Claims, 7 Drawing Sheets

METHOD AND SYSTEM FOR DECODING OFDM SIGNALS SUBJECT TO NARROWBAND INTERFERENCE

FIELD OF THE INVENTION

This invention relates to wireless communications, and more particularly to decoding orthogonal frequency division multiplexing (OFDM) signals subject to narrowband interference.

BACKGROUND OF THE INVENTION

Interference can reduce the reliability of wireless (radio) communications. When an interfering source is near a receiver, and when the interference source generates signals with sufficient power in a frequency band of interest in a wireless channel between the source and the receiver, the power of a desired signal at the receiver can be much lower than the power of the interference.

A blanking technique is generally used to remove signal samples that are subject to the interference. For example, if the interfering source generates a wide-band signal, some time samples in the received signal can be corrupted by the interference. The receiver can replace these time samples with a high power by zeros, thus blanking out both the desired signal and interference in these time samples. Then, the desired signal can later be decoded if a correcting procedure is used.

Narrowband Symbols and Tones

As defined herein, an OFDM signal includes data symbols and pilot symbols. Because OFDM symbols are transmitted as frequency tones in subcarriers of the wireless signal, the data symbols and pilot symbols are often referred to as data tones and pilot tones. Hereinafter, the terms symbols and tones are used interchangeably.

If the interfering source generates the narrowband signal, then the receiver can replace corrupted interfering frequency tones by zeros, thus blanking out both the desired signal and the interference at these specific frequency tones.

For narrowband interference, the effectiveness of blanking techniques depends on the ability of the receiver to determine the frequency tone at which the interference is present. If the coherence bandwidth of the wireless channel is larger than the bandwidth of a wireless transmission, then the interference can be detected by comparing the received power of each received frequency tone. This is relatively simple.

However, when the transmission requires a bandwidth that is larger than the coherence bandwidth of the wireless channel, then the receiver needs to estimate both the channel characteristics as well as possible interference at the same time. This is difficult.

The IEEE 802.22-05/0262r0 standard "Orthogonal Interference Detection" specifies how to concurrently estimate channel characteristics and the interference. Within a coherent frequency band, at least two pilot tones are transmitted by a transmitter. By definition of coherence bandwidth, these two pilot tones have similar received power. When the difference between the received powers of the two pilot tones is large, the presence of interference is likely. It is explicitly stated in the IEEE 802.22-05/0262r0 standard that "two symbols in one group must be in the same coherence bandwidth, but the symbols in different groups do not need to satisfy [the interference detection formula]". In other words, the prior art does not use pilot tones from outside of the coherence band to determine interference within a band.

It is desired to provide a method and system for joint wireless channel estimation and narrowband interference.

SUMMARY OF THE INVENTION

Embodiments of the invention provide a method to decode a wireless channel in presence of narrowband interference. The method can provide soft decoding information for an error correction procedure. The channel is estimated using all pilot tones in a transmission, regardless of whether the pilot tones are located within the same coherence band, or in different coherence bands.

DETAILED DESCRIPTION OF THE PREFERRED EMBODIMENT

Figure 1:
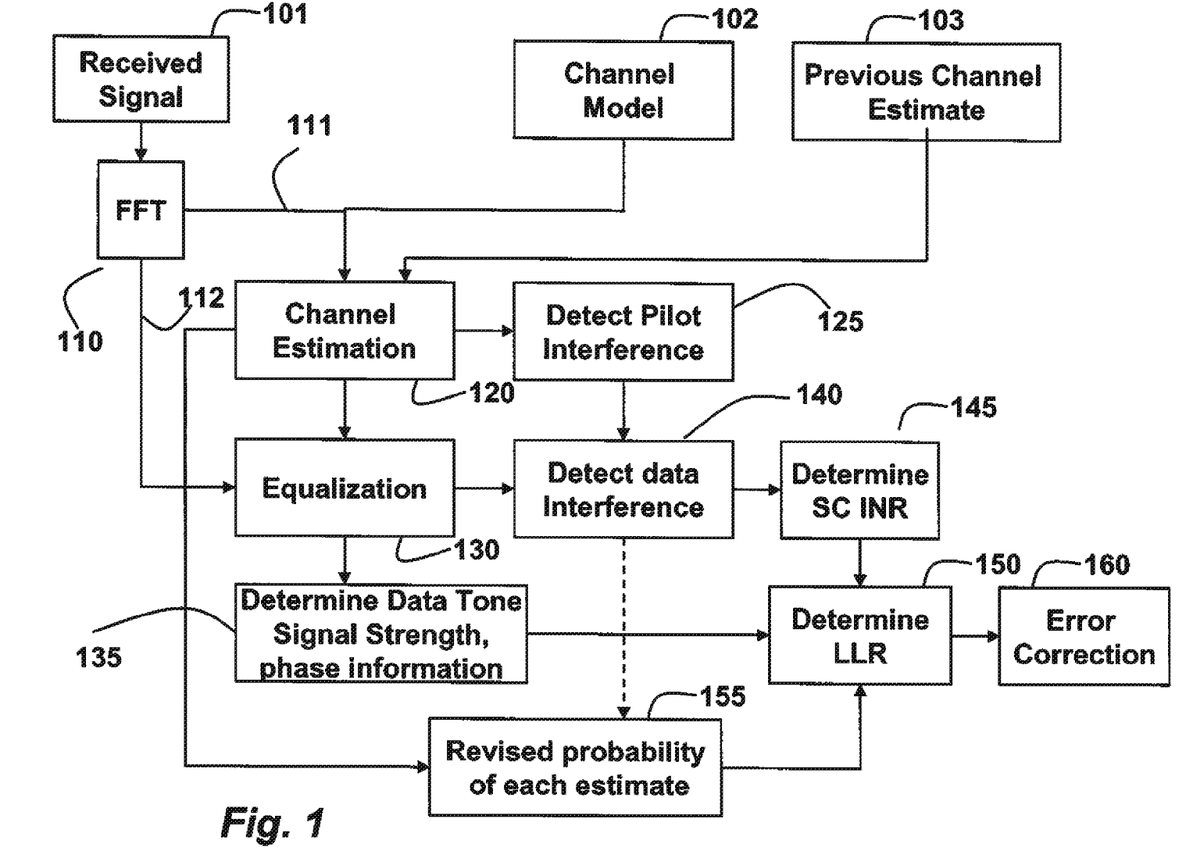
FIG. 1 is a block of a method and system for estimating a wireless channel, detecting interference, and decoding a signal in a receiver according to embodiments of the invention.

FIG. 1 shows a method and system for estimating a wireless channel, detecting interference, and decoding a signal in receiver according to embodiments of our invention. When the receiver receives an orthogonal frequency division multiplexing (OFDM) signal 101, the system performs a fast frequency transform (FFT) 110 to obtain a set of pilot tones 111 and a set of data tones 112 embedded in different frequency subcarriers (SCs).

The receiver extracts 111 the pilot tones to perform channel estimation 120. Conventionally, channel estimation is done by direct interpolation of the pilot tones. However, this invention projects the extracted pilot tones to channel realizations that are allowed by an underlying channel model 102.

During the preamble time of a transmitted packet, the complete preamble signal is known and no subcarriers are used. This can be viewed as a special case of this invention where every subcarrier is a pilot tone.

Given a set of received pilot tones and the channel model, it is possible to determine a small number of channel estimates that are likely. If a past channel estimate 103 within a coherent time of the channel is available, then the previous channel estimate can also be used to the improve channel estimation. For each likely channel estimate, the receiver maintains a probability of each estimate.

Using the channel model and extracted pilot tones, the channel estimate can reveal the received power of certain pilot tones is very different from the expected channel estimate, which is likely interference. The interference of these pilot tones is detected 125.

Concurrently, the data tones in the SCs are equalized 130 according to the channel estimate. The equalized data tones enable the receiver to determine the signal strength of the data tones, and phase information, which is an important component to determine a log-likelihood ratio (LLR) of the received bits represented by the data tones.

Because interference can also be present, the calculation of LLR also needs information regarding the power of the interference. Hence, at the output of the equalizer, the receiver also detects 140 the data interference. This step compares the power difference between the data interference and the pilot interference. The estimated signal interference can be used to determine 145 subcarrier interference-to-noise ratio (SC INR). The LLR determination 150 is based on the SC INR.

While detecting data interference, it is possible that the receiver needs to revise 155 the probability of each channel estimates. For each channel estimate, a different LLR value of the data subcarriers can result. The receiver determines a weighted sum of the LLR values according to the probability of the channel estimate. The combined LLR of the bits represented by the data tones can be input to an error correction procedure 160 at the receiver to fully recover the received signal.

The key novelty of this invention lies in:
- the channel estimation uses all pilot tones in all subcarriers, and the channel model;
- equalization and decode the SCs uses the likelihoods of multiple channel estimates and the interference estimates; and
- multiple likelihoods that are obtained from the multiple channel estimates are combined.

Channel and Interference Estimation

In the prior art, channel estimation is performed directly using only the pilot tones. An interpolation is used to estimate the wireless channel of the data subcarriers between the pilot tones. While such approach is simple, it does not exploit information regarding the wireless channel between the transmitter and the receiver.

We consider a wireless channel that has only limited multipath, so that the impulse of the channel over time takes a form $$h(t) = \sum_{i=1}^{L} g_i \delta(t - \tau_i),$$

where t is time, $g_i$ is a complex value, L is very small, e.g., $L \leq 5$, $\delta$ is the Delta function, and $\tau$ is multipath delay according to the wireless channel.

If the frequency of the pilot tones is set as $f_1, \ldots, f_K$, then the received pilot tones $a_1, \ldots, a_K$ are located in a 2L-dimensional complex pilot subspace satisfying $$a_1 = g_1 \exp(-j2\pi f_1 \tau_1) + g_2 \exp(-j2\pi f_1 \tau_2) + \ldots + g_L \exp(-j2\pi f_1 \tau_L) \quad (1)$$
$$a_2 = g_1 \exp(-j2\pi f_2 \tau_1) + g_2 \exp(-j2\pi f_2 \tau_2) + \ldots + g_L \exp(-j2\pi f_2 \tau_L)$$
$$\vdots$$
$$a_K = g_1 \exp(-j2\pi f_K \tau_1) + g_2 \exp(-j2\pi f_K \tau_2) + \ldots + g_L \exp(-j2\pi f_K \tau_L).$$

Figure 2:
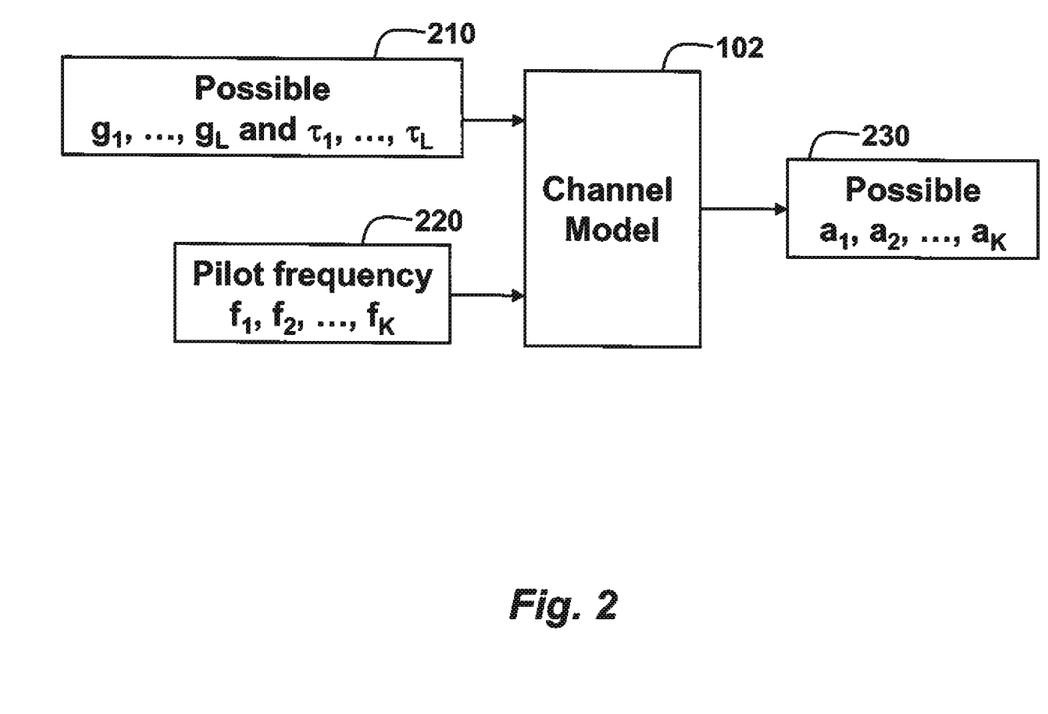
FIG. 2 is a schematic of construction of a pilot subspace according to embodiments of the invention.

FIG. 2 summarizes the construction of the pilot subspace. The channel model 102 takes all possible value of $g_1, \ldots, g_L$, $\tau_1, \ldots, \tau_L$, 210, pilot frequency $f_1, \ldots, f_K$ 220. All possible pilot tones $a_1, \ldots, a_K$ 230 take on values that are allowable by the channel Eq. (1).

Figure 3:
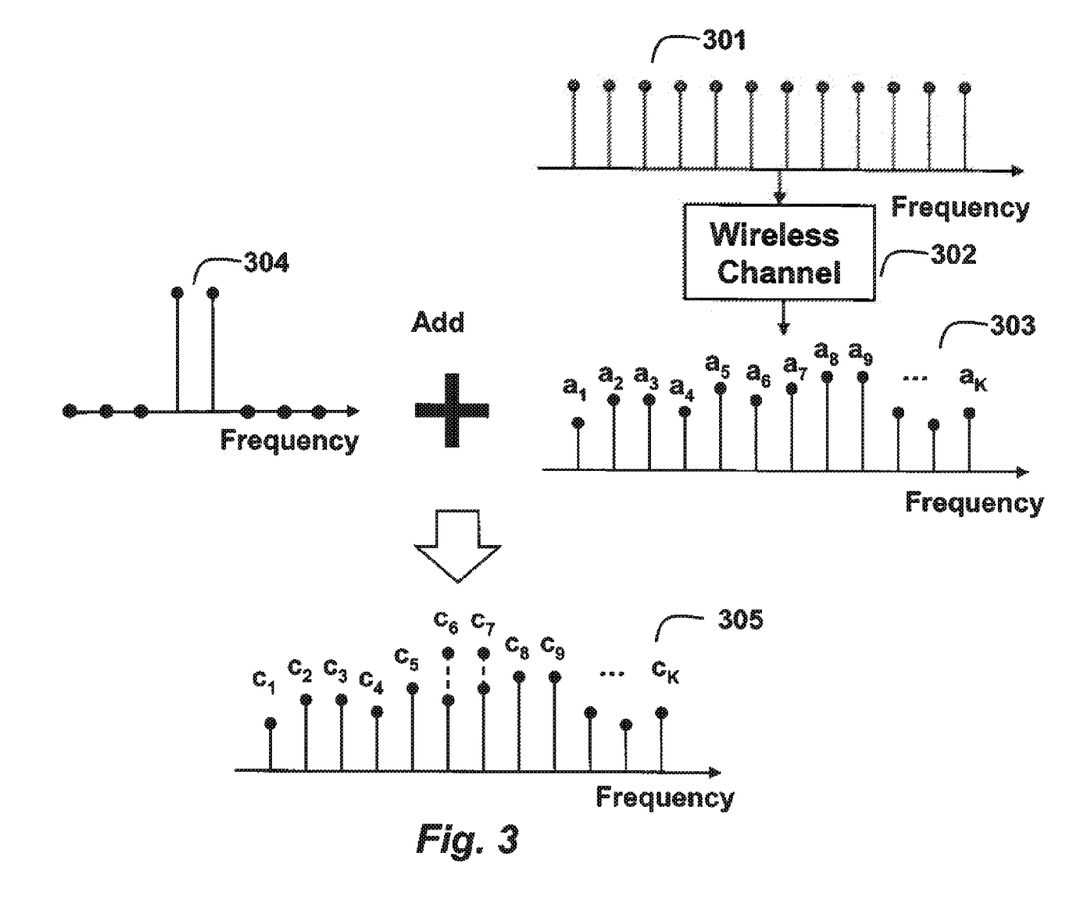
FIG. 3 is a schematic of received pilot tones with and without interference according to embodiments of the invention.

FIG. 3 shows pilot tone 301 transmitted through a wireless channel 301, received pilot tones without interference 303, narrowband interference 302, and received pilot tones with interference 305.

When pilot tones are transmitted through the wireless channel, the received pilot tones $a_1, \ldots, a_K$ without interference and noise satisfy Eq. (1). In presence of the narrowband interference, some pilot tones receive extra power. As a result, the receiver observes pilot tones $c_1, \ldots, c_K$ that contain both interference and noise.

In the prior art, if the $c_5$ is not within the same coherent bandwidth as $c_7$, then their values are not used to check if interference is present in these two tones.

in the embodiments of the invention, because all received pilot tones are located in the pilot subspace satisfying Eq. (1), all pilot tones are used concurrently to estimate the presence of interference at any pilot tone.

Figure 4:
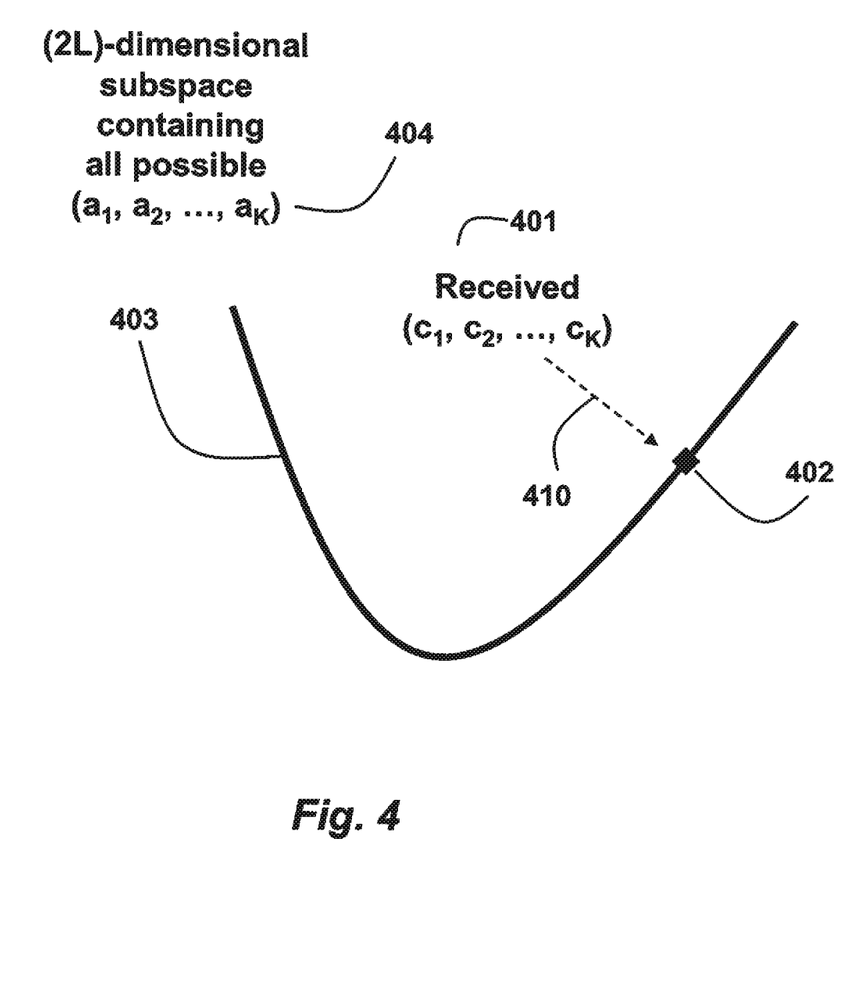
FIG. 4 is a schematic of the pilot subspace according to embodiments of the invention.

FIG. 4 shows how to optimally estimate the channel estimate from $c_1, \ldots, c_K$. The received pilot tones $(c_1, \ldots, c_K)$ 401 are projected 410 to a nearest point 402 in the pilot subspace 403 containing all possible values of $(a_1, \ldots, a_K)$ 404 without interference and noise. Any conventional least square error projection technique can be used to accomplish this.

Figure 5:
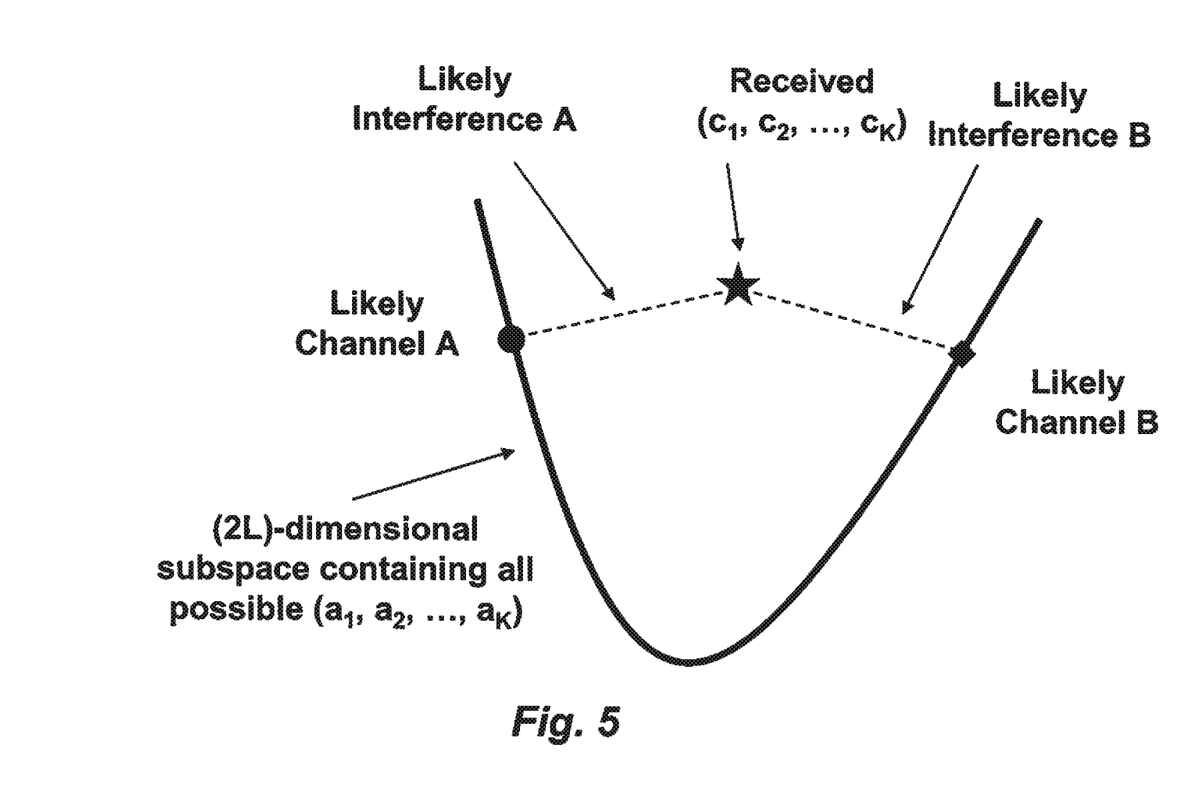
FIG. 5 is a schematic of likely channel realization according to the pilot subspace.

As shown in FIG. 5, it is possible that the set of received tones $(c_1, \ldots, c_K)$ is nearest to multiple likely channels (A and B), because the subspace of all possible channel realization is not linear. Physically, this corresponds to the case where the receiver has multiple likely candidates where the interference is present. This is possible because the number of pilot tones is limited. In this case, the receiver determines all likely channels (for example, Channel A and Channel B in FIG. 5), and a posteriori probabilities that such channels can result given the received pilot tones.

To determine the a posteriori probability, the channel model needs to be further enhanced. It is possible to obtain a priori probability distribution of $g_i$ and $\tau_i$, and Bayes rule can be used to estimate the a posteriori probability. If such information is not available, then it is possible to assume that each likely channel has equal probability.

When a previous channel estimate that is within a coherent time of the channel model has been made, this information can be used further to revise the probability of the likely channel estimate.

For each likely channel estimates, equalization and decoding data subcarriers are performed.

Equalization and Decoding Data Subcarriers

Figure 6:
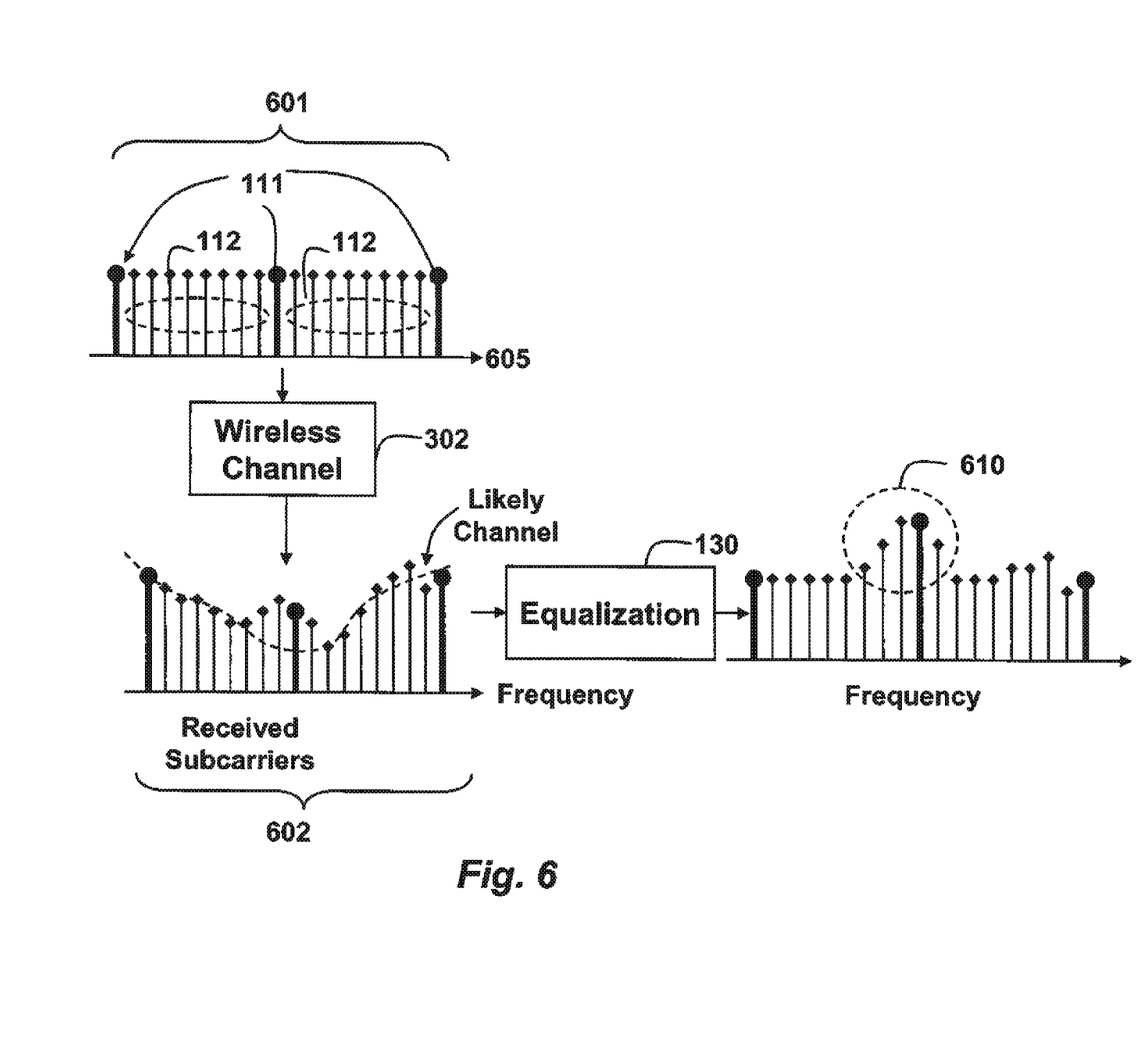
FIG. 6 is a schematic of likely locations of interference are equalization according to embodiments of the invention.

FIG. 6 shows an equalization scheme and decoding procedure. In the example, binary phase shift keying (BPSK) or quadrature phase-shift keying (QPSK) modulation is assumed so that the transmitted power of each data symbol is the same. When more advanced modulation schemes are used, such as quadrature amplitude modulation (QAM), the transmit powers at different subcarriers are different. In that case, averaging can also be performed.

As shown in FIG. 6, the received signal includes a set of three pilot tones 111 and a set of sixteen data tones 112 in frequency subcarriers 605. All data tones and pilot tones are transmitted using equal power, the wireless channel causes the received subcarriers 602 to have different power. From the projection mechanism described above, a likely channel candidate is determined. All data tones and pilot tones can be equalized using the likely channel candidate.

The equalized tones can have varying power. Because the transmitted powers are assumed to be the same, the varying power must be caused by the interference. The receiver uses the varying power information to detect the likely interference 610 on data tones. In some systems, the characteristic of interference can be known. In this case, the receiver can use this information to validate the likelihood of the channel estimate given the observed interference across data tones. This knowledge can lead to revisions 155 in the probability estimate of the likely channel.

Combining Likelihoods

Figure 7:
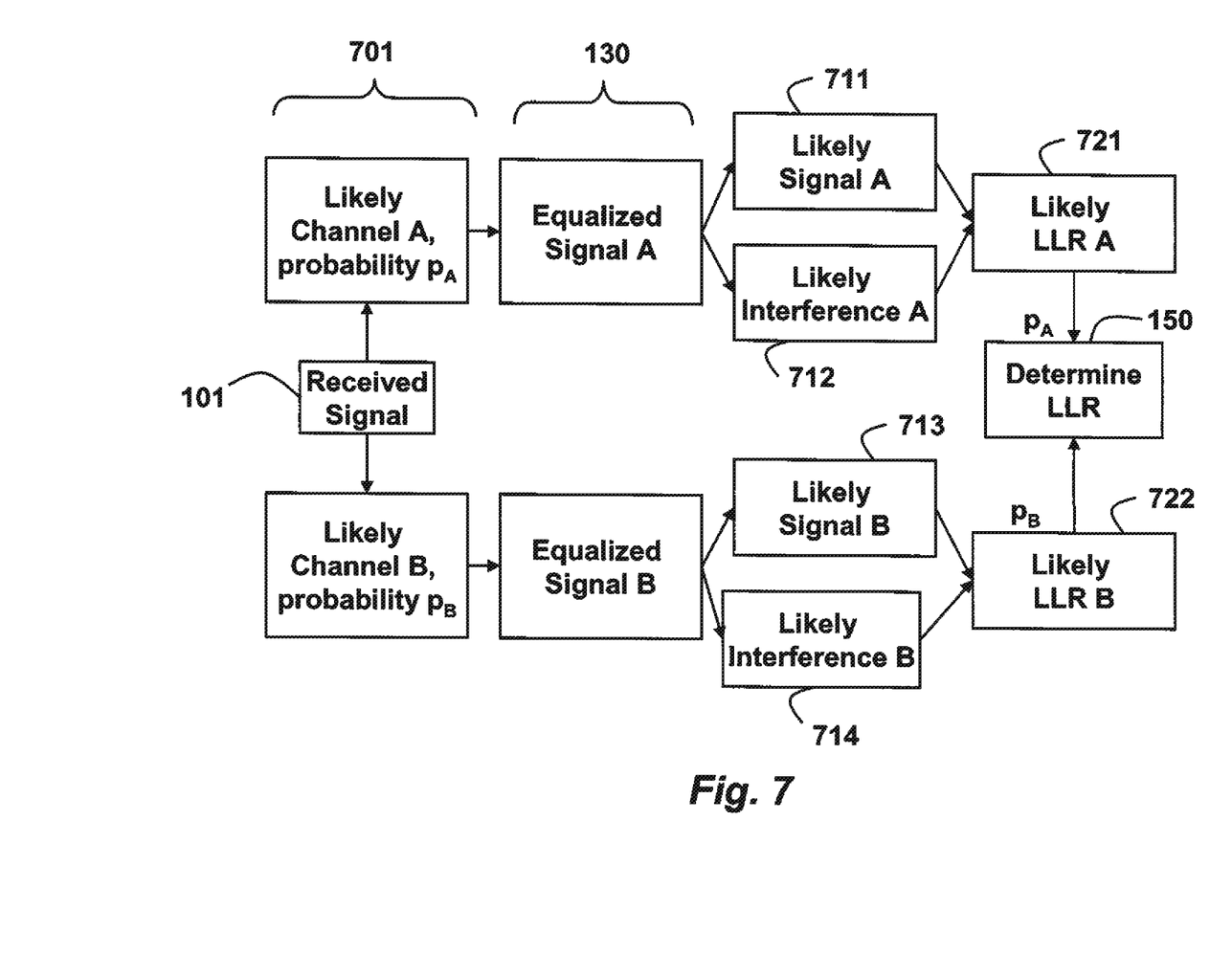
FIG. 7 is a block diagram of determining log-likelihood ratios based on likely signals and interference according to embodiments of the invention.

FIG. 7 further shows how multiple channel estimates are used, and how their output are combined to determine a final LLR as input to error detection algorithm.

Using the pilot tones in received signal 101 and the channel model, multiple likely channels 701 are determined, as well as their a posteriori probability. In the example, two likely channels, Channel A and Channel B, are considered. The likely Channel A is used to equalize 130 received signal to produce equalized signal A, and a likely channel B is used to equalize received signal to produce equalized signal B. The equalized signal A is then used to determine the likely signal A 711 as well as likely interference A 712. The signal and interference at each subcarrier can be used to determine 150 the LLR A 721.

Similarly, the equalized signal B and likely interference B can be used to determine LLR B 713 and the likely interference 714. Because the likely channel A has probability $p_A$, and the likely channel B has the probability $p_B$, the final LLR can be determined using weighted sum of the actual probability of the bits corresponding to the LLR values.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for estimating a channel, detecting interference, and decoding a signal at a receiver, wherein the channel and receiver are wireless, and wherein the signal is transmitted using narrowband orthogonal frequency division demultiplexing (OFDM) and frequency subcarriers, and the signal includes a set of data tones and a set of pilot tones, comprising the steps of:

estimating the channel and pilot tone interference based on all the pilot tones extracted from the signal and a channel model;

equalizing the set of data tones extracted from the signal based on the channel estimate;

detecting data interference according to the pilot interference and the equalized data tones;

determining subcarrier interference-to-noise ratios based on the data interference;

determining signal strengths of the data tones based on the equalized data tones; and determining log-likelihood ratios of bits represented by the data tones based on the subcarrier interference-to-noise ratios and the signal strength of the data tones.

2. The method of claim 1, wherein the extracting uses a fast frequency transform.

3. The method of claim 1 wherein the tones are embedded in different frequency subcarriers.

4. The method of claim 1, wherein the estimating uses a previous channel estimate.

5. The method of claim 1, further comprising:

revising the channel estimate based on the data interference.

6. The method of claim 1, wherein the log-likelihood ratios are weighted and summed.

7. The method of claim 1, wherein the estimating further comprises:

projecting the pilot tones to a nearest point in a pilot subspace.

8. The method of claim 7, wherein the projecting uses a least square error projection.

9. The method of claim 1, wherein the estimating results in a plurality of channel estimates.

10. The method of claim 1, wherein the receiver maintains probability of each of the channel estimates.

11. The method of claim 1, wherein the estimating further comprises:

using the log-likelihood ratios in an error correction procedure.

* * * * *